(12) United States Patent  
Page

(10) Patent No.: US 12,391,371 B2
(45) Date of Patent: Aug. 19, 2025

(54) AIRCRAFT WITH OUTBOARD-STOWED LANDING GEAR

(71) Applicant: JetZero, Inc., Long Beach, CA (US)

(72) Inventor: Mark A. Page, Orange, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 17/958,779

(22) Filed: Oct. 3, 2022

(65) Prior Publication Data

US 2024/0109650 A1   Apr. 4, 2024

(51) Int. Cl.
| | |
|---|---|
| *B64C 25/10* | (2006.01) |
| *B64C 25/00* | (2006.01) |
| *B64C 25/04* | (2006.01) |
| *B64C 39/10* | (2006.01) |

(52) U.S. Cl.
CPC ............. *B64C 25/10* (2013.01); *B64C 25/04* (2013.01); *B64C 39/10* (2013.01); *B64C 2025/008* (2013.01); *B64C 2039/105* (2013.01)

(58) Field of Classification Search
CPC ... B64C 25/10; B64C 25/36; B64C 2039/105; B64D 39/10
See application file for complete search history.

(56) References Cited

U.S. PATENT DOCUMENTS

| | | | |
|---|---|---|---|
| 2,562,905 A | 8/1951 | Gadeberg | |
| 3,762,670 A * | 10/1973 | Chillson | B64C 25/36 244/50 |
| 5,000,400 A | 3/1991 | Stuhr | |
| 5,692,703 A | 12/1997 | Murphy et al. | |
| 5,984,229 A * | 11/1999 | Hollowell | B64C 15/02 244/12.4 |
| 6,854,689 B1 | 2/2005 | Lindahl et al. | |
| 7,216,830 B2 | 5/2007 | Quayle et al. | |
| 7,581,699 B1 * | 9/2009 | Tafoya | B64D 7/00 244/119 |
| 7,621,481 B2 | 11/2009 | Hershberger et al. | |
| 7,871,042 B2 | 1/2011 | Velicki et al. | |
| 8,967,526 B2 | 3/2015 | Karem | |
| 10,384,796 B2 | 8/2019 | Alexander | |
| 2002/0145075 A1 * | 10/2002 | Page | B64C 39/10 244/36 |
| 2004/0069897 A1 | 4/2004 | Corcoran | |
| 2007/0023571 A1 | 2/2007 | Kawai et al. | |
| 2012/0193470 A1 | 8/2012 | Kosheleff | |
| 2013/0119198 A1 * | 5/2013 | Campbell | B64C 1/00 156/79 |

(Continued)

FOREIGN PATENT DOCUMENTS

GB   2601781   *   6/2022

OTHER PUBLICATIONS

M. A. Page, E. J. Smetak, S. L. Yang,, Single-Aisle Airliner Disruption With a Single-Deck Blended-Wingbody, Sep. 14, 2018.

*Primary Examiner* — Ashesh Dangol
(74) *Attorney, Agent, or Firm* — Caldwell Intellectual Property Law

(57) ABSTRACT

A landing gear apparatus for an aircraft including at least a nose gear disposed forward of a neutral point of an aircraft by a first distance and at least a main gear disposed aft of the neutral point of the aircraft by a second distance. The at least a nose gear and the at least a main gear are in communication with one another.

15 Claims, 15 Drawing Sheets

(56) References Cited

U.S. PATENT DOCUMENTS

2014/0175215 A1\* 6/2014 Gallant ..................... B64F 1/30
                                                      244/36
2018/0281934 A1  10/2018 Guering et al.
2020/0207464 A1\* 7/2020 Whitlock ................ B64C 25/26
2021/0024203 A1\* 1/2021 Chappell .............. F16F 13/002

\* cited by examiner

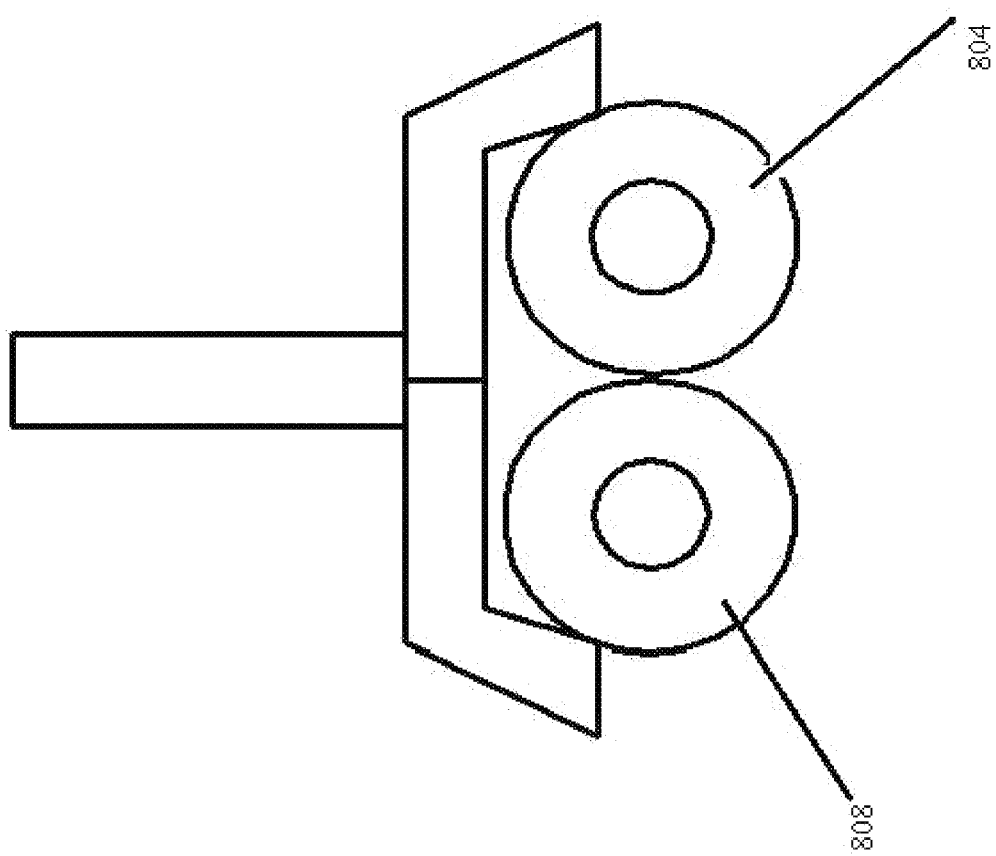

AIRCRAFT WITH OUTBOARD-STOWED LANDING GEAR

FIELD OF THE INVENTION

The present invention generally relates to the field of aircraft. In particular, the present invention is directed to an aircraft with outboard-stowed landing gear.

BACKGROUND

Landing gear is typically stowed on the exterior of an aircraft to allow proper landing procedure. Storage of landing gear is limited by the center of gravity of the aircraft. Existing solutions are not satisfactory.

SUMMARY OF THE DISCLOSURE

In an aspect an aircraft with stowed landing gear outboard of a cabin comprising a fuselage. The fuselage includes an exterior surface, an interior surface, and a cargo volume defined by the interior surface. There is a plurality of gear wells, wherein each gear well of the plurality of gear wells includes an opening in the exterior surface and disposed under the aircraft. each gear well has a gear well volume that is located outboard of the cargo volume. Additionally, there is a plurality of landing gears disposed at the plurality of gear wells, wherein each landing gear has a proximal end located within the gear well volume and a distal end, each landing gear has at least a wheel journaled at the distal end and each landing gear is movable between a deployed position in which the at least a wheel is outside the gear well and a retracted position in which the at least a wheel is inside the gear well.

In another aspect, a method for manufacturing an aircraft with stowed landing gear outboard of a cabin. The aircraft is a blended wing body that stores landing gear within a plurality of gear wells. The gear wells are attached to the blended wing body aircraft. The gear wells protrude into wing of the aircraft. The landing wheels are arranged in tandem, and then mounted in a two-wheel truck. The landing gear is mounted in a tricycle formation with the nose gear being forward the center of gravity and the main gear being aft the center of gravity.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8A illustrates a profile view model of tandem landing wheels;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure allow for stowing landing gear outboard of a cabin to allow more valuable payload volume availability within the cabin. "Outboard" refers to a location away from the midline of the aircraft, such as a passenger cabin. Stowing landing gear outboard of a cabin is less disruptive to an aircraft design than to stow landing gear within a cabin. The landing gear is in tricycle formation which places about 4% to 11% of their total weight on the nose gear, leaving the remainder of support on the main gear. Because of this weight distribution the main landing gear is a short distance ahead of the center of gravity which in the present case will be relatively in line with the payload storage. Since the center of gravity is located within the payload storage, the landing gear can be outboard the cargo volume. To reduce any unnecessary intrusion into the payload storage, the landing gear wheels will be arranged in a tandem two-wheel truck instead of side by side as is common. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 6. Furthermore, there is no intention to be bound by any expressed or implied theory presented in this disclosure.

Figure 1A:
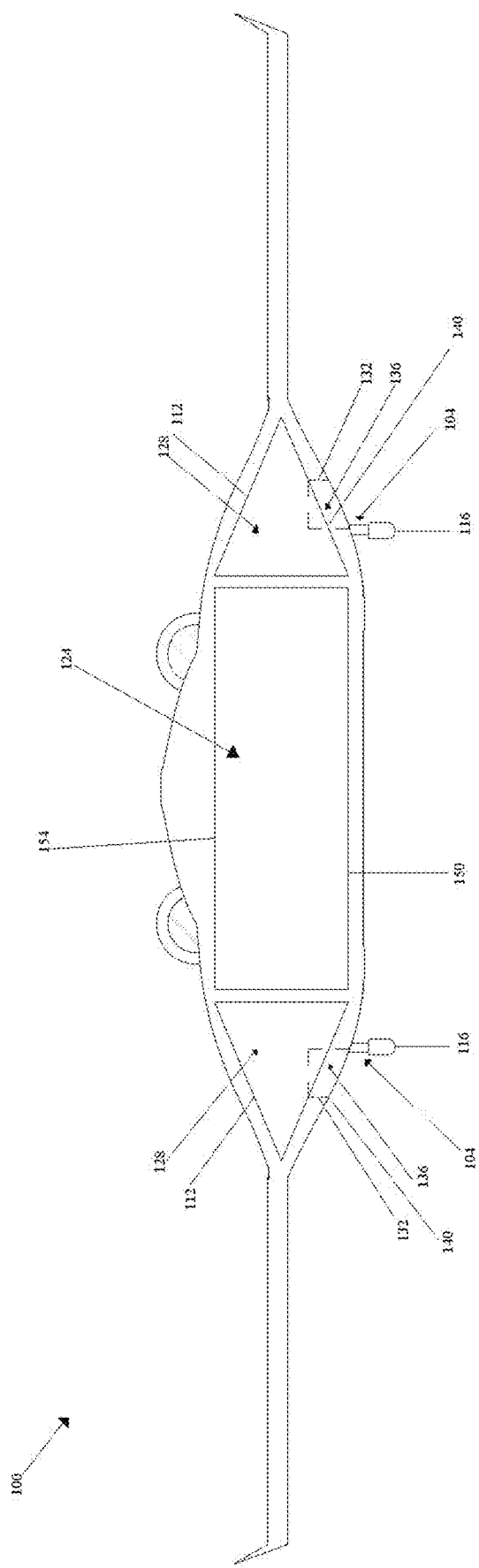
FIG. 1A illustrates an internal straight on view of the BWB aircraft with cargo-stowed landing gear.

Referring now to FIG. 1A, an exemplary embodiment of an aircraft 100 with outboard stowed landing gear 104 is illustrated. For the purposes of this disclosure, "outboard" refers to the relative position of an object as being closer to the outside of an aircraft. As a nonlimiting example, a first object may be considered to be outboard of a second object if the first object is further from the geometric center of the aircraft than the second object. Aircraft 100 may be a blended wing body aircraft. A "blended wing body" (BWB), also known as a "blended body" or a "hybrid wing body"

(HWB), is a fixed-wing aircraft body having no clear or abrupt demarcation between wings and a main body of the aircraft along a leading edge of the aircraft. An aircraft with cabin stowed landing gear comprises a fuselage including an exterior surface, an interior surface, and a general cargo volume defined by the interior surface. An "exterior surface" for the purpose of this disclosure, refers to the outer surface of aircraft 100. A "lower airframe" for the purpose of this disclosure, refers to the supporting lower framework of aircraft 100. The lower airframe may include any supporting structures such as wheels, skids, or supporting struts that can be used to absorb the shock or impact during landing. An "interior surface" for the purpose of this disclosure, refers to the inner surface of the aircraft. The interior surface may contain the cockpit, passenger cabin, payload storage, and any other areas that are held inside of the aircraft's exterior surface. Within the interior surface of aircraft 100, there is payload volume 154. A "payload volume" for the purposes of this disclosure, refers to the area within the interior of aircraft 100 where the passenger cabin 124 is located. Anything contained within the passenger cabin 124 may be contained within the payload volume 154. Payload storage 112 may be above single deck 150 and next to passenger cabin 124. Payload storage 112 may contain cargo volume 128. Cargo volume 128 may contain landing gear housing 140.

With continued reference to FIG. 1A, in some cases, exterior surface of aircraft may have a first exterior surface and a second exterior surface opposite the first exterior surface which may take the form of a blended wing body. For example, first exterior surface and second exterior surface may include a top and bottom of aircraft. Alternatively or additionally, first exterior surface and second exterior surface may include a left and right side of aircraft. Additionally or alternatively, first exterior surface and second exterior surface may include a front and aft of aircraft. There may be an underbody of the aircraft which is beneath the first exterior surface and the second exterior surface. The underbody of the aircraft may be an area underneath fuselage, transition, and wing sections of an aircraft. There may also be an interior surface of the aircraft which is between first exterior surface and second exterior surface. Aircraft 100 has a center of gravity 144 which may be a point about which weight of aircraft is balanced. In some cases, aircraft 100 center of gravity is a short distance ahead of the main landing gear 104 and at least a short distance aft the nose landing gear 108 located on the lower airframe. Aircraft 100 comprising of the nose and main gear in a tricycle formation. As used herein, a "tricycle arrangement" is an arrangement where in at least 3 components form a triangular shape around center of gravity 144. In an embodiment, there may be two main gears connected to two main wheels 116 and one nose gear connected to one nose wheel 120 such that the three gear assemblies with wheels may form a tricycle arrangement.

Further referencing FIG. 1A, landing gear may additionally include at least a main gear 104. As used in this disclosure, "main gear" is landing gear located aft of nose gear. In some cases, main gear may include substantially two landing gear assemblies and nose gear may include substantially one landing gear assembly, although any number and arrangement of landing gear is possible. In some cases, at least a main gear 104 may be located substantially aft of single deck. Main gear 104 may include main wheel 116. A "main wheel" for the purposes of this disclosure, refers to a wheel that is rotatably attached to the support structures on the main landing gear. Main wheel 116 may be like nose gear 120. In some cases, one or more of at least a nose gear 108 and at least a main gear 104 occupies a gear housing 140. As used in this disclosure, a "gear housing" is a location within the aircraft wherein landing gear is housed. Gear housing for at least main gear 104 may be contained within payload storage 112. Gear housing for nose gear 10 may be stowed outboard of the passenger cabin 124. Commonly, landing gear is retractable and gear housing is a compartment into which the landing gear retracts, for instance during flight. Additional disclosure relating to landing gear may be found in Non-provisional application Ser. No. 16/181,687 filed on Nov. 6, 2018, and entitled "TILTING LANDING GEAR SYSTEMS AND METHODS," and Non-provisional application Ser. No. 16/730,754 filed on Dec. 30, 2019, and entitled "TILTING LANDING GEAR SYSTEMS AND METHODS," the entirety of each of which is incorporated herein by reference.

With reference to FIG. 1A. aircraft 100 may have a single deck 150 (i.e., single passenger and cargo floor). A "single deck" for the purposes of this disclosure, refers to a flat deck within the interior of an aircraft. Single deck 150 may represent the floor of the passenger cabin 124 and the floor of payload storage 112. In some cases, passengers may ride within passenger cabin 124 which may be located atop single deck 150. Single deck 150 may be made of Nomex Honeycomb. Passenger cabin 124 may be in the upper portion of the fuselage. The floor of passenger cabin 124 may be carpeted in a blend of linen and wool. Single deck 150 may serve as the contiguous wall between passenger cabin 124. The term "contiguous" means the bottom surface of passenger cabin 124 and the bottom of aircraft 100 share at least a common border. Payload storage 112 may be contained in the space adjacent to passenger cabin 124. Payload storage 112 may be contained within the space on either side or both sides of passenger cabin 124. Main gear 104 may be stored within the payload storage on either or both sides of passenger cabin 124. Main gear 104 may retract upward and inwards or outwards into the gear housing within the payload storage volume. Payload storage 112 may house main landing gear 104 while it is stowed in gear well 132. Gear well 132 may be contained within payload storage 112.

With reference to FIG. 1A, main landing gear 104 and nose landing gear 108 retract upwards and inwards such that the gear may be stowed within outboard passenger cabin 124. The nose and main landing gear are stored inside of gear wells 132. A "gear well" for the purpose of this disclosure, refers to a recessed compartment under an airplane that may allow for the reception of a wheel of a retractable landing gear. Each gear well 132 has a gear well volume 136. A "gear well volume" for this purpose of this disclosure, refers to the area within a gear well that may be used to store any gear associated with aircraft landing. Each gear well 132 includes an opening in the exterior surface and is disposed at the lower airframe of the aircraft. An "opening in the exterior surface" for this purpose of this disclosure, refers to a section of the under aircraft that has been removed so that the gear wells can be stored within the interior of the aircraft. Gear wells 132 also may be contained within the cargo volume 128. A "cargo volume" for the purpose of this disclosure, refers to the total space within the payload storage. Landing gear and any other cargo may be stored within cargo volume 128 in the payload storage. Gear wells 132 may protrude into the interior of cargo volume 128. Cargo volume 128 may at least partially house gear wells 132, thus the volume that is contained within the gear wells may also be housed within payload storage. The interior of payload storage comprises of at least cargo volume 128, whereas the exterior of the payload storage occupies the fuselage and may be adjacent to the passenger cabin 124. An actuator may be used to employ retract and deployment procedures for main landing gear 104 and nose landing gear 108, this will be discussed further below. Payload storage may at least contain any cargo and landing gear associated with aircraft 100. Gear well volume 136 comprises of at least a structural and system component. Main landing gear 104 and nose landing gear 108 may be contained within gear well volume 136, as well as any components that are needed to operate the landing gear system. Landing gear may include electromechanical components. For example, a suspension may be tuned such that there is a relationship between the nose gear 108 and the main landing gear 104, given a certain loading on either the nose wheel 120 or the main wheel 124. Tuning may consist of programming from a controller such that a force on a nose component may cause an opposite reaction on a main component.

Referring to FIG. 1A, in a non-limiting embodiment main gear 104 may be stored within the wings of aircraft 100. Wing storage may indicate that main gear 104 is retracted upwards and outwards into corresponding gear housing contained within the interior of the aircraft wings. In a non-limiting embodiment, gear well 132 associated with main gear 104 may define a hole in the lower surface of the lower center body wing structure through which to store main gear 104. Landing gear housing may be contained partially in the payload storage volume and the interior of the aircrafts. Landing gear housing does not need to be contained within only one region of the aircraft.

Figure 1B:
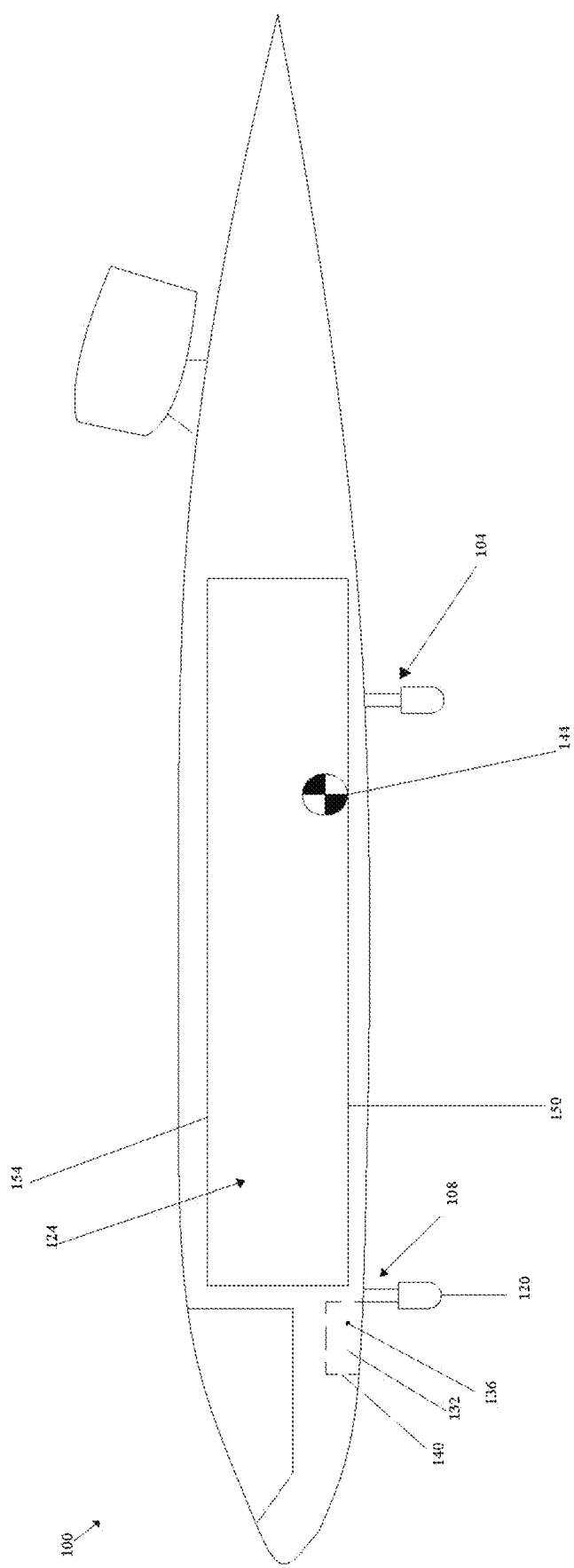
FIG. 1B illustrates a side view of the BWB aircraft with cargo-stowed landing gear.

Now referencing to FIG. 1B, "landing gear" is a flight component that may make contact with the earth during take-off/and or landing. For instance, landing gear may include without limitation wheels, tires, skis, floats, and the like. For instance, landing gear may include without limitation wheels, tires, skis, floats, and the like. In some cases, landing gear may include at least a nose gear 108. As used in this disclosure, "nose gear" is forward most landing gear. Typically, nose gear is located in nose of aircraft and is thus referred to as nose gear. Nose gear 108 contains nose wheel 120. A "nose wheel" for the purposes of this disclosure, refers to the wheel that is rotatably attached to the support structures on the nose landing gear. The term "rotatably attached" refers to a mechanical attachment that allows members to rotate and move around a central connection. As used in this disclosure, a wheel is a component within a gear landing gear assembly that is configured to contact and roll on the ground. Wheel may include a pneumatic tire, or the like. A tire may be composed at least in part of an elastomeric material such as rubber. An aircraft tire may include an interior lumen or sealed chamber, which may also be annular, and which may be filled with pressurized gas to increase the tire's resistance to elastic deformation, permitting it to bear greater weight without allowing the rim to contact the ground. Aircraft tire may be capable of being exposed to temperatures below −40° C. and/or above 200° C. without losing elasticity or integrity. Aircraft tires may be composed of, without limitation rubber, nylon, cord, and/or steel. Aircraft tires may include a tire tread pattern. As used in this disclosure a "tire tread pattern" is a circumferential groove molded into the rubber of the tire to improve traction. For example, and without limitation, a tire tread pattern may be composed of 4 circumferential grooves molded into the aircraft tire to channel water away from the tire surface. In an embodiment and without limitation, tire tread patterns may be designed to maximize the amount of rubber contacting the ground to decrease the landing distance and/or enhance braking performance.

Figure 2:
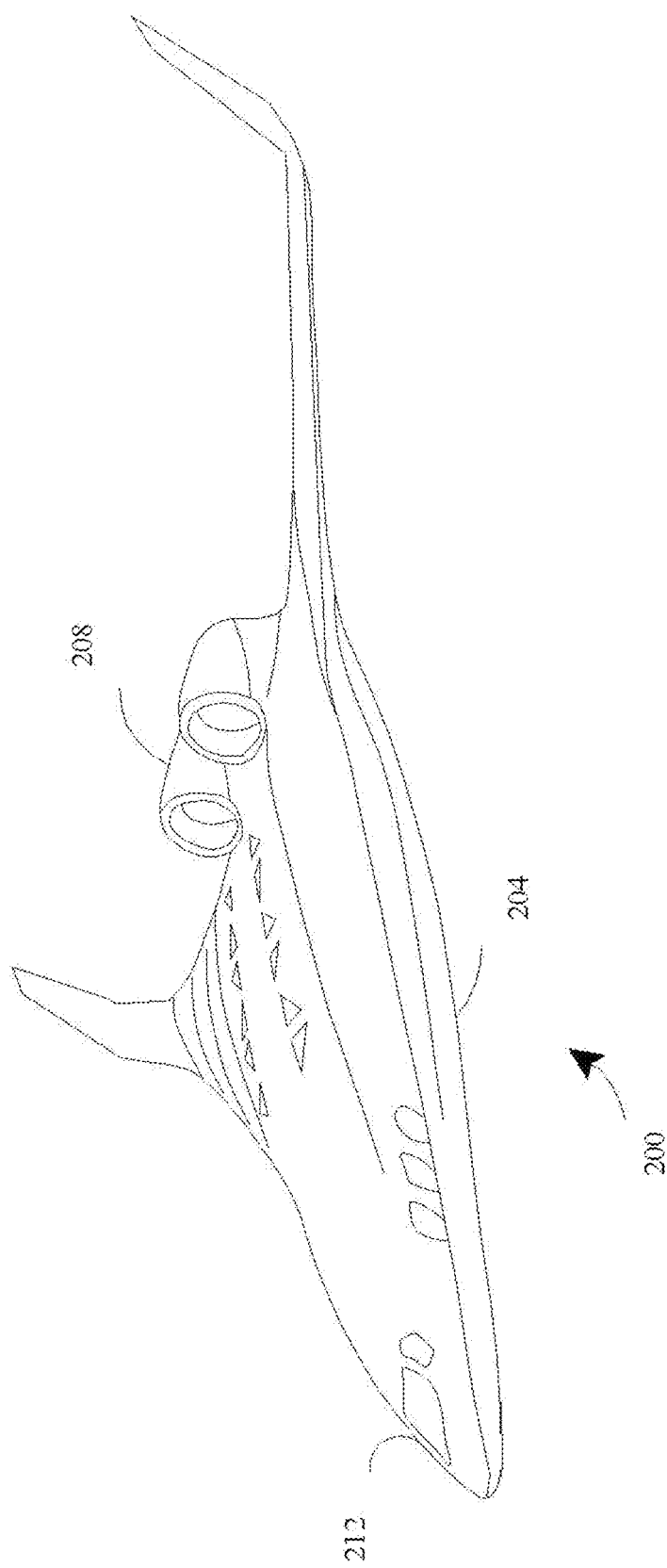
FIG. 2 illustrates an exemplary model of a BWB aircraft.

Referring to FIG. 2, an exemplary blended wing aircraft 200 is illustrated. Aircraft 200 may include a blended wing body 204. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 204 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 204 design may or may not be tailless. One potential advantage of a BWB 204 may be to reduce wetted area and any accompanying drag associated with a conventional wing-body junction. In some cases, a BWB 204 may also have a wide airfoil-shaped body, allowing entire aircraft to generate lift and thereby facilitate reduction in size and/or drag of wings. In some cases, a BWB 204 may be understood as a hybrid shape that resembles a flying wing, but also incorporates features from conventional aircraft. In some cases, this combination may offer several advantages over conventional tube-and-wing airframes. In some cases, a BWB airframe 204 may help to increase fuel economy and create larger payload (cargo or passenger) volumes within the BWB. BWB 204 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 2, BWB 204 of aircraft 200 may include a nose portion. A "nose portion," for the purposes of this disclosure, refers to any portion of aircraft 200 forward of the aircraft's fuselage 216. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 2, BWB 204 may include at least a structural component of aircraft 200. Structural components may provide physical stability during an entirety of an aircraft's 200 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 200 structure, they may be so named A, B, C, and so on named from nose to tail. Pillars, like any structural element, may be disposed a distance away from each other, along an exterior of aircraft 200 and BWB 204. Depending on manufacturing method of BWB 204, pillars may be integral to frame and skin, comprised entirely of internal framing, or alternatively, may be only integral to structural skin elements. Structural skin will be discussed in greater detail below.

With continued reference to FIG. 2, BWB 204 may include a plurality of materials, alone or in combination, in its construction. At least a BWB 204, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 204 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 204 may additionally or alternatively use wood or another suitably strong yet light material for an internal structure.

With continued reference to FIG. 2, aircraft 200 may include monocoque or semi-monocoque construction. BWB 204 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 2, BWB 204 may include at least a fuselage. A "fuselage," for the purposes of this disclosure, refers to a main body of an aircraft 200, or in other words, an entirety of the aircraft 200 except for nose, wings, empennage, nacelles, and control surfaces. In some cases, fuselage may contain an aircraft's payload. At least a fuselage may comprise structural components that physically support a shape and structure of an aircraft 200. Structural components may take a plurality of forms, alone or in combination with other types. Structural components vary depending on construction type of aircraft 200 and specifically, fuselage. A fuselage 212 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 2, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 200. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 200 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 2, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 2, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 2, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 2, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 2, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 204. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in2) or Pascals (Pa). In semi-monocoque construction stressed skin bears part of aerodynamic loads and additionally imparts force on an underlying structure of stringers and formers.

With continued reference to FIG. 2, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 200 is in its level flight orientation or sitting on ground. A post may act similarly to stringer in that it is configured to support axial loads in compression due to a load being applied parallel to its axis due to, for example, a heavy object being placed on a floor of aircraft 200. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 2, aircraft 200 may include at least a flight component 208. A flight component 208 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 200 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 200. In some embodiments, at least a flight component 208 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 2, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 2, at least a flight component may be one or more devices configured to affect aircraft's 200 attitude. "Attitude", for the purposes of this disclosure, is the relative orientation of a body, in this case aircraft 200, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 200. A plurality of attitude datums may indicate one or more measurements relative to an aircraft's pitch, roll, yaw, or throttle compared to a relative starting point. One or more sensors may measure or detect an aircraft's 200 attitude and establish one or more attitude datums. An "attitude datum", for the purposes of this disclosure, refers to at least an element of data identifying an attitude of an aircraft 200.

With continued reference to FIG. 2, in some cases, aircraft 200 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 2, in some cases, aircraft 200 may include at least a pilot control. As used in this disclosure, a "pilot control," is an interface device that allows an operator, human or machine, to control a flight component of an aircraft. Pilot control may be communicatively connected to any other component presented in aircraft 200, the communicative connection may include redundant connections configured to safeguard against single-point failure. In some cases, a plurality of attitude datums may indicate a pilot's instruction to change heading and/or trim of an aircraft 200. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 200. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 208 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 2, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 208. At least a flight component 208 may include any propulsor as described herein. In embodiment, at least a flight component 208 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 2, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 2, at least a flight component 208 may include wings, empennages, nacelles, control surfaces, fuselages, and landing gear, among others, to name a few. In embodiments, an empennage may be disposed at the aftmost point of an aircraft body 204. Empennage may comprise a tail of aircraft 200, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 200 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 200 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 204 aircraft 200 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 208 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 208 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 200. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 200 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 2, aircraft 200 may include an energy source. Energy source may include any device providing energy to at least a flight component 208, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 2, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 204 of aircraft 200, for example without limitation within a wing portion 212 of blended wing body 208. Aviation fuels may include petroleum-based fuels, or petroleum and synthetic fuel blends, used to power aircraft 200. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 200. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 2, modular aircraft 200 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 2, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 2 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 2, aircraft 200 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 2, aircraft 200 may include multiple flight component 208 sub-systems, each of which may have a separate energy source. For instance, and without limitation, one or more flight components 208 may have a dedicated energy source. Alternatively, or additionally, a plurality of energy sources may each provide power to two or more flight components 208, such as, without limitation, a "fore" energy source providing power to flight components located toward a front of an aircraft 200, while an "aft" energy source provides power to flight components located toward a rear of the aircraft 200. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 208. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 2, aircraft 200 may include a flight component 208 that includes at least a nacelle 208. For the purposes of this disclosure, a "nacelle" is a streamlined body housing, which is sized according to that which is houses, such as without limitation an engine, a fuel store, or a flight component. When attached by a pylon entirely outside an airframe 204 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 200 partially or wholly enveloped by an outer mold line of the aircraft 200. At least a nacelle may be designed to be streamlined. At least a nacelle may be asymmetrical about a plane comprising the longitudinal axis of the engine and the yaw axis of modular aircraft 200.

With continued reference to FIG. 2, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 2, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 2, in nonlimiting embodiments, at least a flight component 208 may include an airbreathing engine such as a jet engine, turbojet engine, turboshaft engine, ramjet engine, scramjet engine, hybrid propulsion system, turbofan engine, or the like. At least a flight component 208 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 2, an aircraft 200 may include a flight controller. As used in this disclosure, a "flight controller" is a device that generates signals for controlling at least a flight component 208 of an aircraft 200. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

Figure 3:
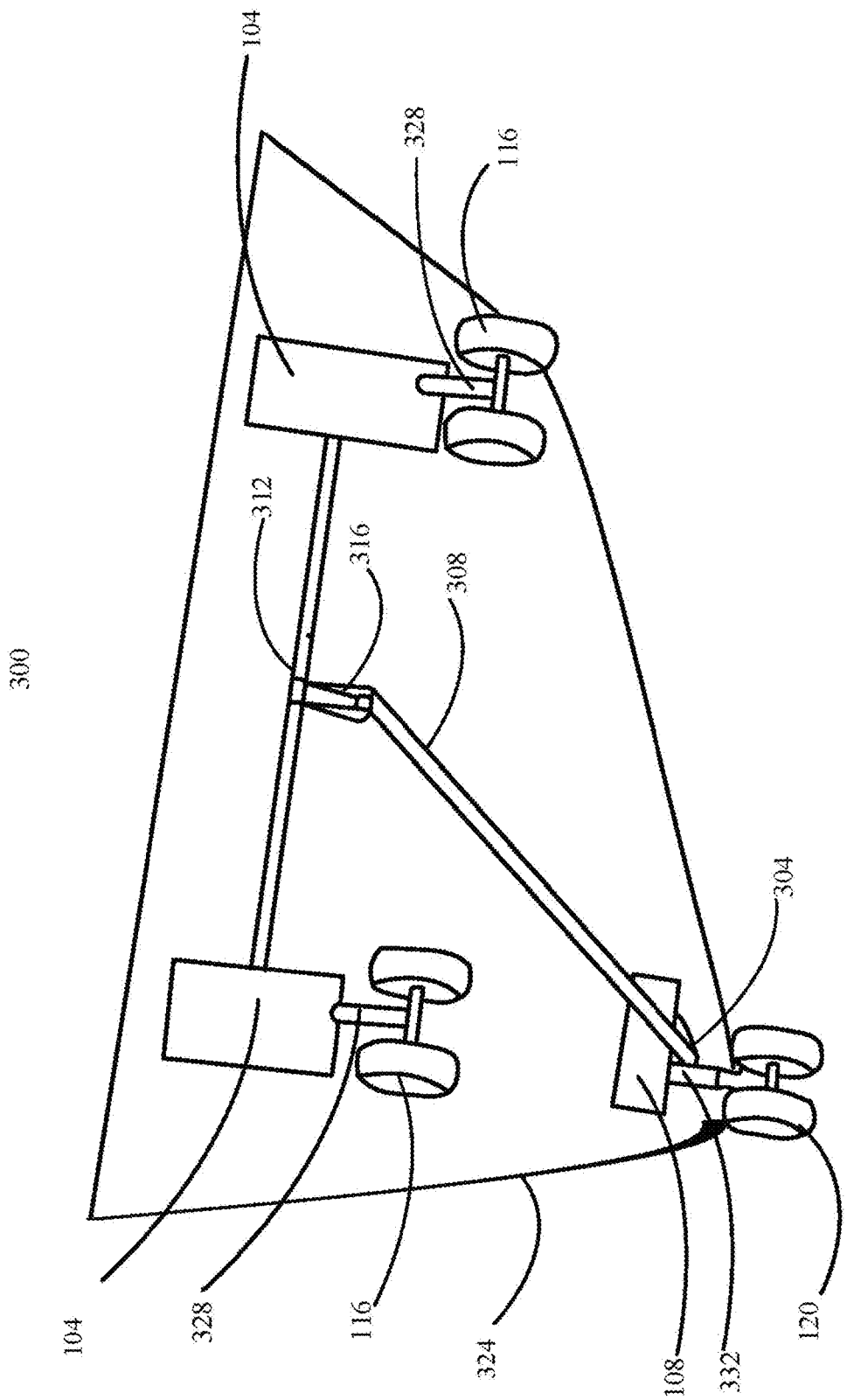
FIG. 3 represents the gear placement of the BWB aircraft with cargo-stowed landing gear.

With continued reference to FIG. 3, landing gear may also be contained within the payload storage, the nose and main landing gear may be near the center of gravity. There may be at least two main gear struts 328 placed a short distance behind the aircraft center of gravity. The main gear struts 328 may be mounted to the lower airframe 324 inboard from the payload storage by a distance approximately equal to the length of the main gear 104. Main gear struts 328 may be used to rotatably attach main wheels 116 to the rest of the main landing gear support. At least one of the main gears 104 may be located aft the center of gravity which may allow further support of the plane during landing and take-off. Allowing a substantial amount of plane landing support to be aft the center of gravity may ensure that the plane does not tip backward and create an unstable resting position for aircraft 100. The nose gear 108 may be in front of the center of gravity. The at least nose gear 108 and at least main gear 104 are configured to move in concert. For instance, main gear 104 may move in a direction opposite from nose gear 108. Main gear 104 is connected to lateral shaft 312 which is mechanically connected to longitudinal member 308 by main linkage 316. Longitudinal member 308 and main linkage 316 may be bolted together using a left-hand thread. Main linkage may use Grade 5 (MS90725 and MS90726) Alloy Hex Cap Screws or Grade 8 alloy steel screws. Longitudinal member 308 may be connected to nose gear 108 using Titanium Hi-Tigue fasteners.

Continuing to reference FIG. 3, main linkage 316 and nose linkage 304 may be connected by a longitudinal member 308. Longitudinal member 308 may be a tension cable. Longitudinal member may be a bar, tube, chain, belt, or the like, that translates movement from one sector to another. In some embodiments, longitudinal member 308 may be a central cable. In some embodiments, longitudinal member 308 may comprise a plurality of cables. Longitudinal member 308 may run down the centerline of the aircraft, longitudinally. Longitudinal member 308 may comprise a plurality of cables, including a dual set of cables on opposite sides of the aircraft's centerline. Longitudinal member 308 may be driven by the main linkage 316 and/or the nose linkage 304 such that movement from one linkage may be translated through the longitudinal member 164 and affect the other linkage. Longitudinal member 308 may be a continuous loop of cables that engage through the main linkage 316 and the nose linkage 304. Longitudinal member 164 may be the "rope" that threads through the partial pulleys. Longitudinal member 308 may be composed of materials such as KEVLAR, TECHNORA, VECTRAN, and/or SPECTRA. Longitudinal member 308 may also be composed of metals such as steel, aluminum, titanium, or the like. Longitudinal member 164 may accommodate differential thermal expansion between the cable and an airframe of the aircraft. Longitudinal member 308 may connect to nose linkage 304. Nose linkage 304 may connect to nose gear 108. Nose gear strut 332 may rotatably connect to nose wheel 120. Nose gear strut 332 may be consistent with main gear strut 328.

Figure 4:
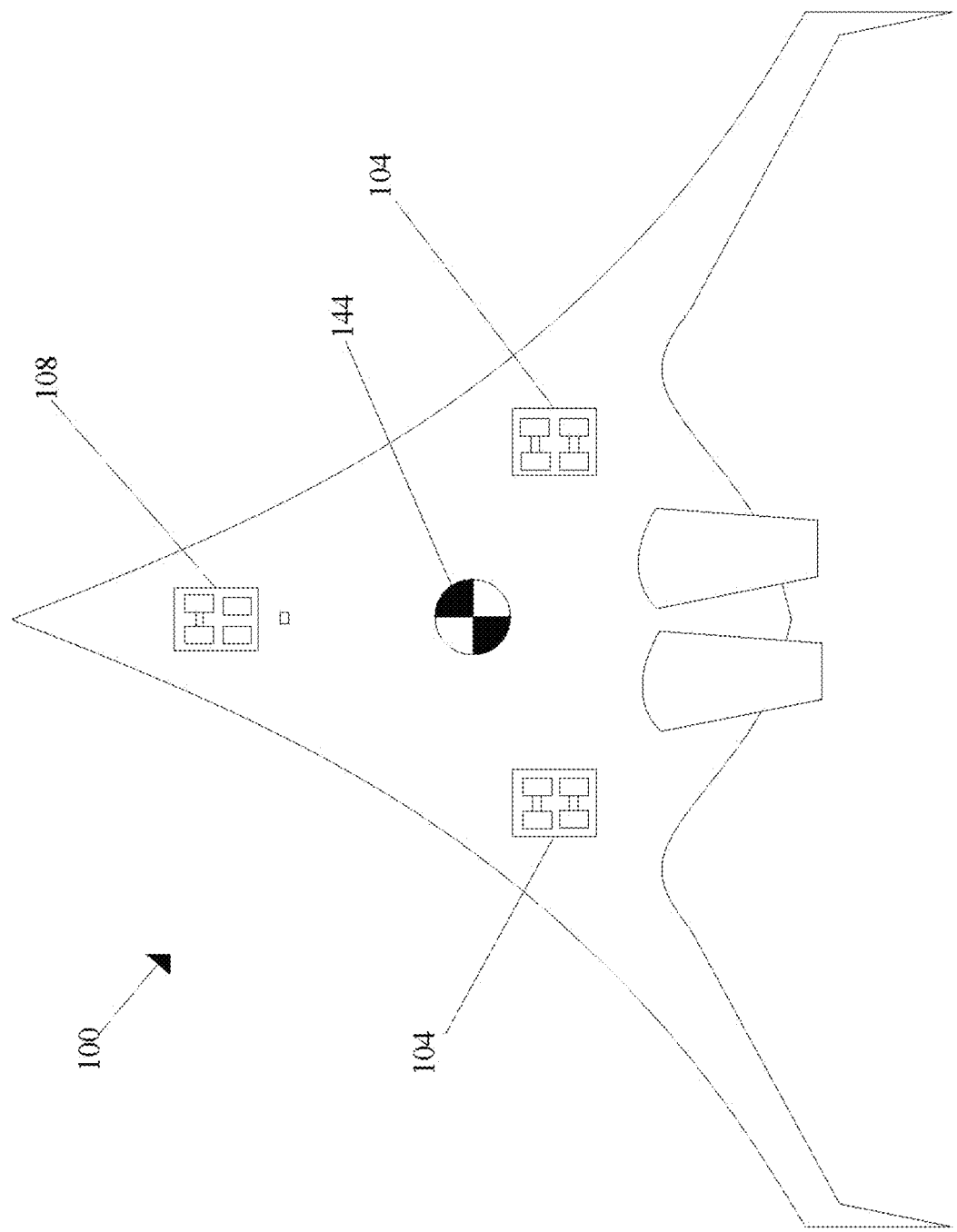
FIG. 4 illustrated the tricycle landing gear arrangement.

With reference to FIG. 4. a tricycle formation may include two nose gears and one main gear. Tricycle gear airplanes typically place between 2% and 11% of their total weight on the nose gear. The remainder is supported by the main gear 104. Further, tricycle landing gear arrangement may include a jump strut. As used herein, a "jump strut" is a dampener that resists vertical compression that is often part of the suspension of a landing gear. Jump strut may be found on the nose gear 108. Jump strut may be varied in length during the takeoff roll, like the two-position gear. Jump strut may vary in length gradually or more rapidly. Gradual extension may be at 0.01 m/s or 0.001 m/s, or the like. Rapid extension may be at 1 m/s, 0.1 m/s, or the like. During gradual extension, aircraft have a nose-low AOA during roll but a nose-high AOA during takeoff, which may reduce the need for an aerodynamic pitching moment to rotate. A nose-low angle may range between 0° to +5°. A wider range may be −3° to +7°. A nose-high angle may range between +3° to as much as +6°. A wider range may be +2° to +10°. During a rapid extension, full extension may be achieved when aircraft reaches rotation speed. In an embodiment, this may achieve a positive pitch rate at the end of the nose gear 108 extension, which may propel the nose even higher, reducing takeoff distance. Jump strut may only extend after a decision to take off is made, the jump strut preserves good breaking characteristics in case of an abandoned takeoff, as the nose remains in a low AOA. A decision may be made by a user, such as a pilot controlling the aircraft. During landing, the jump strut may remain in the "short" position, permitting a conventional landing de-rotation. A "short" position during landing may benefit braking, improve steering, and decrease lift.

Continuing to reference FIG. 4, in some embodiments, tricycle landing gear arrangement may include a conventional landing gear, also referred to as a "tail dragger". In this tricycle arrangement, the nose gear 108 may include two gears located ahead of the aircraft's center of gravity 144 and one main gear 104 located at the aft end of the fuselage, far from the aircraft's center of gravity 144. In this arrangement, takeoff rotation may be achieved by lifting an elevator, located on the tail of the aircraft and discussed in further detail below. Landing may be at higher airspeeds with a reduced deck angle (0 AOA) or could be at a high AOA at a lower airspeed. A range of deck angles in the tail-down position ranges from +3° to +8°. A wider range may be +1° to +14°. Tail-up attitude may be controlled by the pilot, controller 104, or flight control system and may range from −2° to 8°. A wider range may be −5° to +14°. Tail dragger arrangement may enable an easy rotation with little control power necessary.

Additional disclosure on landing gear can be found in U.S. patent application Ser. No. 16/181,687, filed Nov. 6, 2018, entitled "TILTING LANDING GEAR SYSTEMS AND METHODS", which is hereby incorporated by reference.

Figure 5:
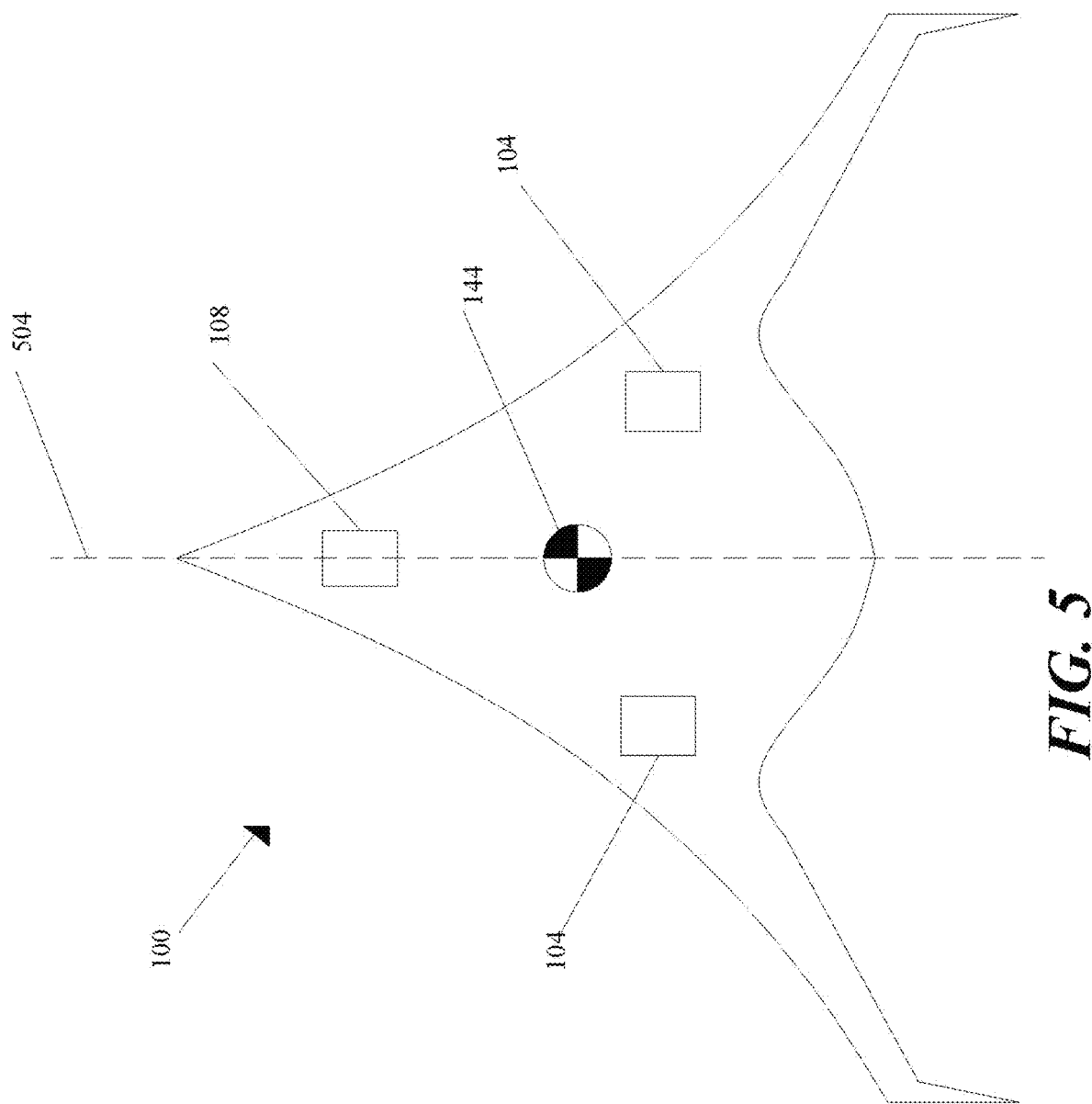
FIG. 5 illustrates the longitudinal axis of the aircraft.

With reference to FIG. 5, aircraft 100 wherein the at least a nose gear 108 is disposed longitudinally forward of the center of gravity and at least one of the main gears 104 is disposed longitudinally aft of the center of gravity near the tail end of aircraft 100. Given an axis 504 intersecting each of the nose and tail of aircraft 100. Axis 504 may longitudinally bisect the nose to the tail of aircraft 100. Center of gravity 144 may lie on longitudinal axis 504. Center of gravity may be a point where the entire weight of aircraft 100 is concentrated so that if supported at this point aircraft 100 would remain in equilibrium in any position. At least one of the main gears 104 may be located aft the center of gravity which may allow further support of the plane during landing and take-off. The term "aft" means near or toward the tail of an aircraft. Allowing a substantial amount of plane landing support to be aft the center of gravity may ensure that the plane does not tilt forward and create an unstable resting position for aircraft 100. The nose gear 108 may be located in front of the center of gravity 144. The at least nose gear 108 and at least main gear 104 are configured to be retracted and/or deployed in tandem. Additional disclosure on landing gear arrangement can be found in U.S. patent application Ser. No. 17/870,365, filed on Jul. 21, 2022, and entitled "NON-COUPLED LANDING GEAR APPARATUS AND METHODS OF USE," which is hereby incorporated by reference.

Figure 6:
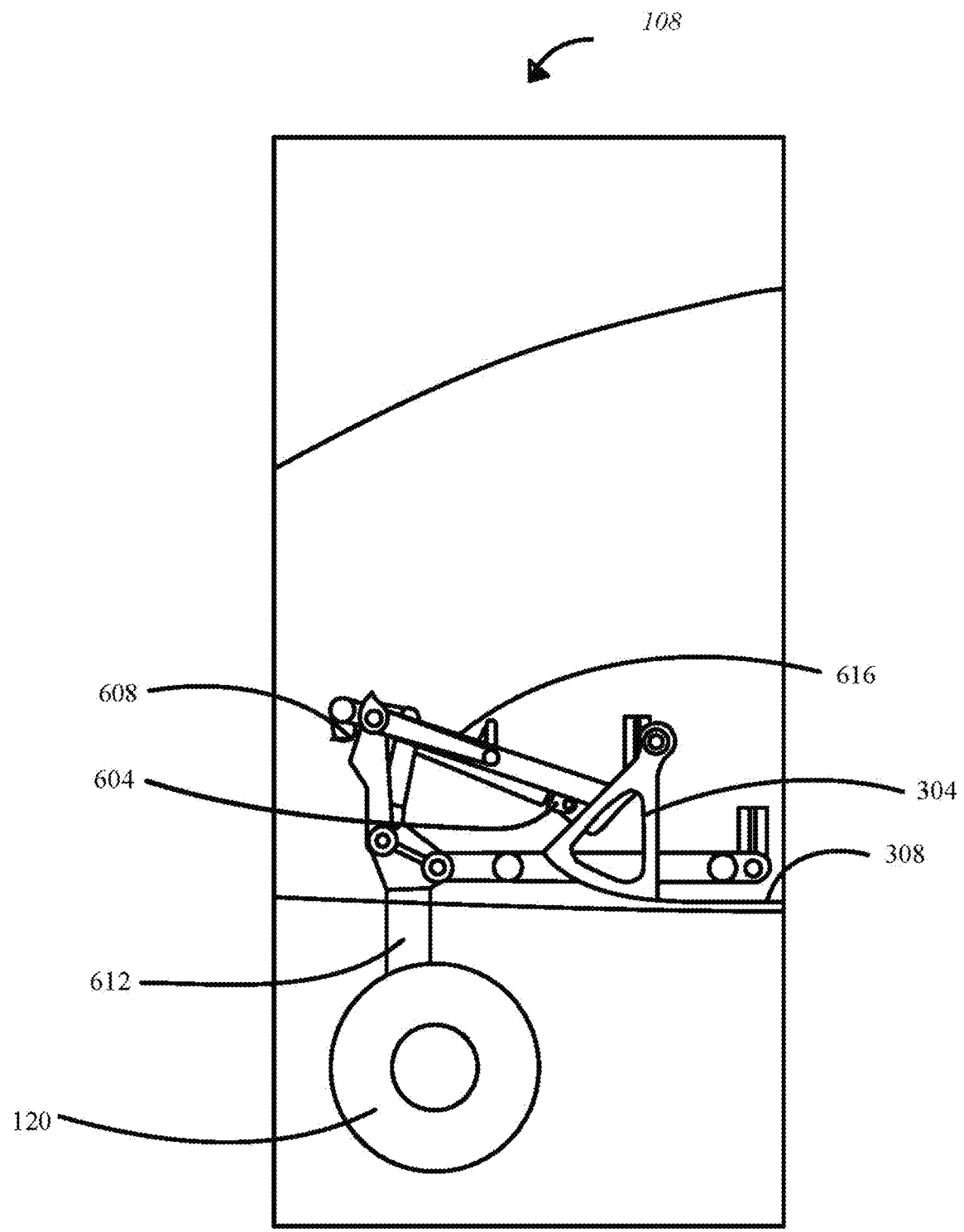
FIG. 6 illustrates a model of the nose landing gear.

Further referencing FIG. 6, nose landing gear 108 may include a sector 608 which is a partial pully that provides extension to a system. Sector 608 may be composed of materials such as aluminum, steel, polycarbonate, carbon fiber, fiber glass or the like. A sector may act as a cam, such that it creates a relationship between cable motion of a main cable and rotary motion of a shaft.

With further reference to FIG. 6, nose gear 108 may include a nose suspension. Nose suspension 612 may be mechanically connected to a nose wheel 128. As used herein, "mechanically connected" is where two or more members are joined with one or more mechanical fasteners such that moving one member will directly or indirectly move a second member. Suspension 612 may include a cylinder and a piston to act as a damper/shock absorber. Suspension 612 may be passive, such that no computing device or external sources are necessary to dampen an impact on suspension 612.

Referencing FIG. 6, nose gear 108 may be connected to a nose linkage 304 on lower airframe 324. A nose linkage may be sector, gear, cam or the like that helps translate motion from one gear to another. A sector is a partial pully that provides extension to a system. A sector may be composed of materials such as aluminum, steel, polycarbonate, carbon fiber, fiber glass, or the like. A sector may function as a cam, such that it creates a relationship between cable motion of a main cable and rotary motion of a shaft, such as a lateral shaft.

Continuing to reference FIG. 6, nose gear 108 may include a pivot piston 604. A "pivot piston" as used herein, translates vertical movement into lateral movement. A pivot piston may include a rotating rod. Pivot piston 604 may be mechanically connected to the nose linkage 304 and the suspension 612 and nose wheel 120. In an embodiment, movement in the nose wheel may compress the suspension 612 which may cause the pivot piston 604 to rotate the nose linkage 304. As a result, nose linkage 304 may pull a longitudinal member 308, affecting main gear 104 on the other end of the longitudinal member 308.

Referencing FIG. 6, actuator includes a component of a machine that is at least responsible for moving and/or controlling a mechanism or system. Nose gear may additionally include a nose gear actuator 616. As used in this disclosure, nose gear actuator 616 is a system that is configured to fold and/or unfold main gear. In some cases, a gear actuator may include an actuator applying mechanical work to a landing gear assembly, for example by way of a crank, a cam, a lead screw and the like.

An actuator, such as those discussed above, may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

Figure 7:
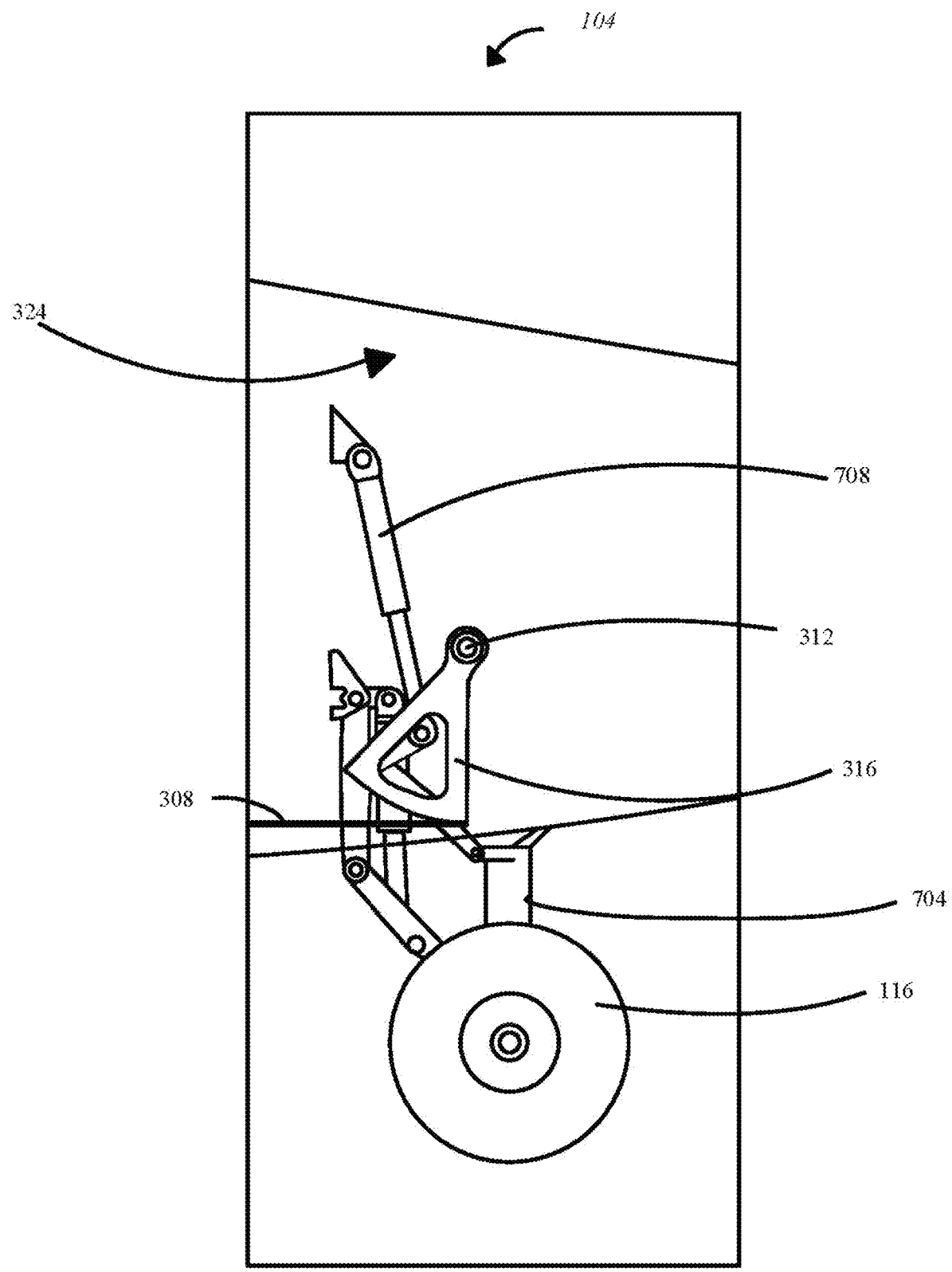
FIG. 7 illustrates a model of the main landing gear.

Reference to FIG. 7, Main landing gear 104 may also include a control that may be designed and/or configured to perform any method, method step, or sequence of method steps in any embodiment described in this disclosure, in any order and with any degree of repetition. For instance, a controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks.

Referencing FIG. 7, Main gear 104 may include a main suspension. Main suspension 704 may be mechanically connected to main wheel 116. Main wheel 116 is a wheel component within the main gear landing gear assembly that is configured to contact and move across a surface. Main wheel 116 embodies the same characteristics of the tire as described above Main suspension 704 may be consistent with nose suspension 612. Main gear 104 may be coupled to a lateral shaft 312. In an embodiment, there may be two main gears attached to either side of lateral shaft 312. Lateral shaft 312 may couple a plurality of main gears such that they may act as a unit. In an embodiment, movement in one main gear 104 may affect another main gear. However, changes/movement in main gear 104 may not affect nose gear 108. Lateral shaft may be a torque tube. A "torque tube: as used herein, transmits force by torsion. Main gear 104 may be connected to main linkage 316. Main linkage 316 may be similar in construction to nose linkage 304. Mechanical components used in main gear 104 may be consistent with mechanical components used in nose gear 108. Main gear may additionally include a main gear actuator. As used in this disclosure, main gear actuator 708 is a system that is configured to fold and/or unfold main gear. Main gear actuator 708 may be consistent with nose gear actuator 616.

Referencing FIG. 8A, main wheel 116 and nose wheel 120 may be arranged in at least a two-wheel truck. Main wheels 116 and nose wheels 120 may be consistent with front wheel 804 and back wheel 808. Two wheels arranged in tandem may result in a back wheel 808 directly behind front wheel 804 instead of the sides of the wheels being next to each other as is common. Tandem arranged wheels may allow storing landing gear to take up less space in payload storage 112 by reducing the width of gear wells 132 and gear well housing 140.

Figure 8B:
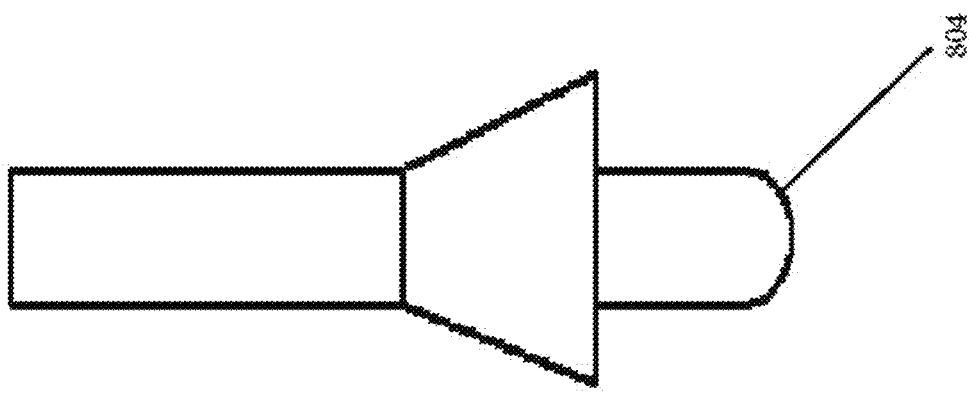
FIG. 8B illustrates a direct view model of tandem landing wheels.

Referencing FIG. 8B, the front view of the tandem wheel arrangement shows that front wheel 804 is shown while back wheel 808 is arranged directly behind therefore not visible from a straight-on view. Landing gear functions provide resistance to side forces when the aircraft 100 is on an earth-based surface. A side force may be applied to the aircraft while stationary or moving. When moving, the side force (lateral resistance) resistance to a side force may enable the aircraft to follow a select path. A side force may include wind, an uneven/tilted surface, or the like. Resistance to side forces may also enable the aircraft to resist un-commanded yaw moments, such as those resulting from wind.

Landing gear may include a brake. Brake may be configured to resist motion of nose wheel 128 and/or main wheel 124. As a non-limiting example, brake may include aircraft disc brakes, thrust reverses, air brakes, large drogue parachutes, and the like thereof. Brakes may generate a frictional force to slow down the aircraft. In an embodiment, a caliper may interact with a brake pad to resist the rotation motion and/or rotation of a wheel. As used in this disclosure a "frictional force" is a force resisting the relative motion of solid surfaces, fluid layers, and/or material elements sliding against one another. In an embodiment, and without limitation, frictional force may include a dry friction. As used in this disclosure a "dry friction" is a force that opposes the relative lateral motion of two solid surfaces in contact. Dry friction may be subdivided into static friction, wherein static friction is force generated between non-moving surfaces, and kinetic friction, wherein kinetic friction is force generated by moving surfaces. In another embodiment, and without limitation, frictional force may include a fluid friction. As used in this disclosure a "fluid friction" is a force between layers of viscous fluid that are moving to each other, wherein the force opposes the relative motion. For example, and without limitation, frictional force may be generated as a function of oil and/or water interact ting with each other. Frictional force may include a lubricated friction. As used in this disclosure a "lubricated friction" is a force generated as a function of a fluid interacting with a solid surface. For example, and without limitation lubricated friction may include a lubricant and/or fluid that separates two solid surfaces. A brake may include, but not limited to, mechanical brakes configured to use mechanical force to initiate a frictional force, hydraulic brakes configured to use hydraulic pressure to initiate frictional force. Brake includes a regenerative brake configured to generate electrical energy. Regenerative braking, as defined herein, is an energy recovery mechanism that recovers energy using the resistance of motion. Additional disclosure related to landing gear may be found in U.S. patent application Ser. No. 17/502,505 entitled "SYSTEMS AND METHODS FOR CONTROLLING LANDING GEAR OF AN AIRCRAFT," the entirety of which is incorporated herein by reference.

Figure 9:
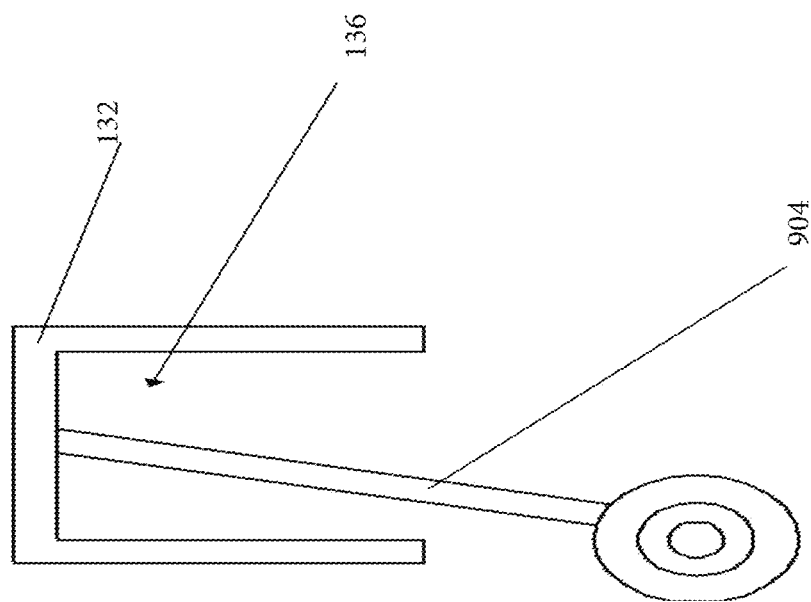
FIG. 9 illustrates a depiction of the deployed landing gear position.

Referencing FIG. 9, deployment position of a landing wheel is outside of the aircraft. The landing wheel is mechanically attached to the distal end of the landing gear. Gear wells 132 may interrupt lower wing structure. Each landing gear 904 is movable between a deployed position in which the at least a wheel is outside the gear well and a retracted position in which the at least a wheel is inside the gear well. Landing gear may additionally include a mechanism to fold and/or unfold (i.e. hinge and or/unhinge). When landing gear is deployed it may be positioned in order to contact ground, for instance for take-off, taxiing, parking, and/or landing. When landing gear is retracted it may be positioned to reduce drag while aircraft is in flight. Referencing FIG. 10, When landing gear 904 is retracted it is positioned at least within the gear well housing 140.

Referencing FIG. 9, deployment positions of the plurality of the landing gear may be controlled by an actuator. Retraction and deployment may be controlled by a controller or a flight controller. For example, the controller may send retraction or deployment signals to the actuators which in turn would prompt movement from the landing gear. The controller may be a flight controller as referenced in the description of FIG. 2 and the controller may be consistent with the computing device in FIG. 12.

With continued reference to FIG. 9, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 9, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 9, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 9, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like. Additionally, gear sensors may be used in association with gear actuators. Gear sensors may be used to detect a status of extension/retraction and/or folding/unfolding of nose gear 108 and/or main gear 120. For example, in some cases gear sensors may detect when landing gear is completely extended/retracted and/or folded/unfolded, for instance by using one or more proximity sensors. Exemplary proximity sensors include without limitation, switches, ultrasonic proximity sensors, time of flight (ToF) sensors, linear encoders, rotational encoders, and the like. Sensors may also include encoders, electrical sensors, imaging sensors, force sensors, Hall sensors, airspeed sensors, throttle position sensors, and the like. Gear sensors may be in communication with controller 104. Controller 104 may control one or both of nose gear actuator and main gear actuator using feedback from gear sensor.

Figure 10:
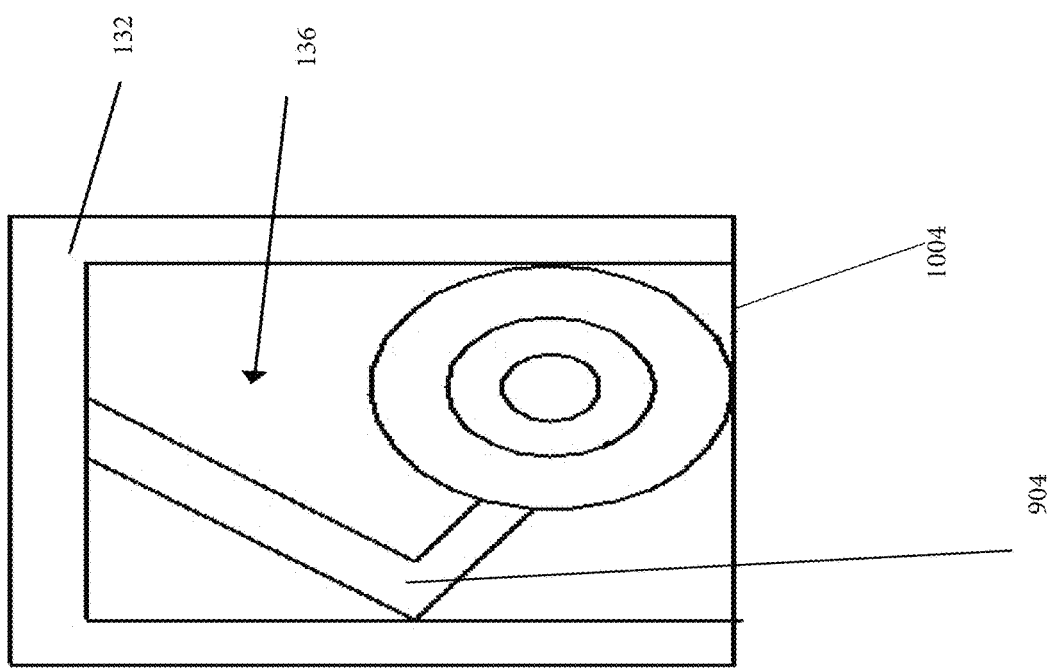
FIG. 10 illustrates a depiction of the retracted landing gear position.

Referencing FIG. 10, a retracted landing gear position is shown. Upon retraction of gear 904, door 1004 may be used to cover the opening of the gear well that is used to store retracted landing gear 904. Door 1004 may be made of the same material used for the exterior of aircraft 100. Door 1004 may be used to keep debris and other objects from entering gear well 132 during flight while landing gear 904 is retracted and stored within gear well volume 136. Actuators used for retraction may be consistent with actuators described for FIG. 9 deployment procedures.

Figure 11A:
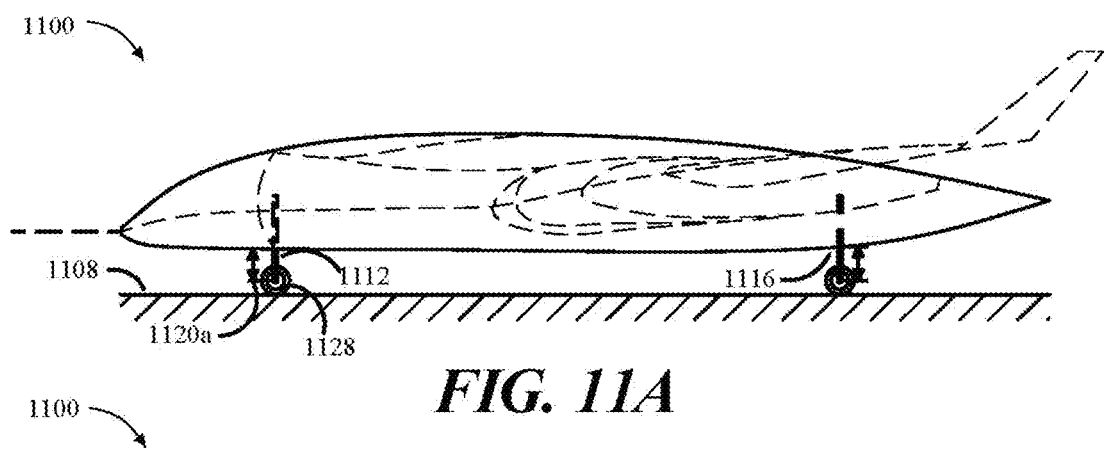
FIG. 11A illustrates an exemplary jump strut at a first rotation.
Figure 11B:
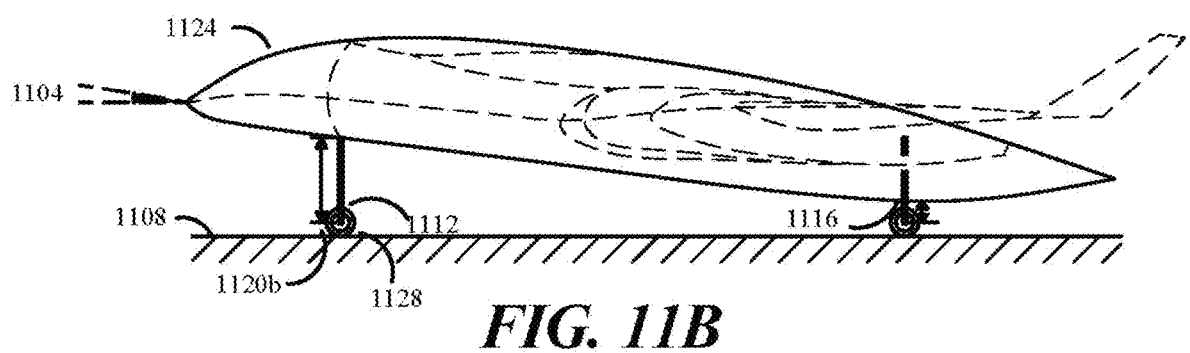
FIG. 11B illustrates an exemplary jump strut at a second rotation.

Now referring to FIGS. 11A and B shows side views of an exemplary embodiment of an aircraft 1100 having a decoupled landing gear system. As used in this disclosure, a "decoupled landing gear system" is a mechanical system that decouple a nose gear 1112 and/or a main gear 1116 and then mechanize the nose gear 1112, providing a desired range of angle of attack 1104 while on the runway 1108 during takeoff phase and/or landing phase of aircraft 1100. In some embodiments, main gear 1116 may include a fixed gear length (while preserving normal suspension travel) to provides even more travel of nose gear 1112. In some embodiments, nose gear 1112 may include a variable length nose gear, wherein the variable length nose gear may increase and/or decrease nose gear length 1120*a-b* within a range. In a non-limiting example, increase nose gear length 1120*a-b* may entail raising the airplane center of gravity (CG). As a result, substantial power is required to extend nose gear 1112 and lift nose 1124. In some embodiments, decoupled landing gear system may connect one or more nose gear wheels 1128 with the airframe 1132. In some cases, variable length nose gear may be applied to aircraft with main gear 1116 located just aft of the aircraft CG, such as, without limitation, aircraft 1100. In a non-limiting example, variable length nose gear may include a pre-set nose landing gear adjustment in which nose gear 1112 may be lengthened shortly before takeoff. This may provide an increased angle of attack 1104 and facilitate aircraft 1100 rotation at a lower speed by increasing wing lift. Lift may offset a nose-down moment of the CG about main gear 1116. In another non-limiting example, variable length nose gear may include a "jump strut," wherein the jump strut lengthens nose gear 1112 rapidly as takeoff rotation speed is approached. Jump strut may include an effect of increasing a nose-up attitude of aircraft 1100 and/or provide a positive pitch rate at the end of the extension of nose gear 1112;

therefore, variable length nose gear may enable an earlier takeoff rotation and a shortened takeoff field length. Additionally, or alternatively, decoupled landing gear system may include nose gear 1112 and/or main gear 1116 that avoids potential high loads, such as, without limitation, aircraft weight, landing touchdown, payload weight, and the like thereof. In a non-limiting example, little load may be applied to nose gear 1112 that touches down first until the main gear 1116 also touches down, thus, avoiding high pitch pitching moments and/or resulting slams of aircraft 1100.

With continued reference to FIGS. 11A and B, In some embodiments, variable length nose gear may change nose gear length 1120*a-b* over a duration of approximately last five seconds of the takeoff roll. In some cases, nose gear length 1120*a-b* at the beginning of the takeoff may be approximately conventional, providing an approximate nose-level attitude. In some embodiments, without limitation, variable length nose gear may be a mechanical drive variable length nose gear, wherein the mechanical drive variable length nose gear may include a mechanical drive that derives power from the one or more spinning nose gear wheels 1128 to lengthen a struct of nose gear 1112 and raise aircraft 1100 to a nose-high attitude. In a non-limiting example, mechanical drive variable length nose gear may include a plurality of components such as, without limitation, one or more nosewheels, a clutch that connects or disconnects the spinning nosewheel from a drive means, a drive means between the one or more nosewheels and a mechanism that varies nose gear strut length, a mechanism that varies nose gear strut length, a reversible gearbox, a low power means of varying nose gear length when not loaded, and the like thereof. In some cases, drive may include further include a drive system such as, without limitation, chain drive system, belt drive system, rotary driveshaft system and the like thereof. In some cases, chain drive system may include components such as, without limitation, driving sprocket, chain, driven sprocket, and the like thereof. In some cases, belt drive system may include components such as, without limitation, driving sprocket, belt, driven sprocket, and the like thereof. In some cases, rotary driveshaft system may include, 90° gear box, rotary drive shaft, receiving gearbox, and the like thereof. In some cases, reversible gearbox may enable nose gear 1112 to lengthen or shorten under while coupled to one or more spinning nose gear wheel 1128. In some cases, low power means of varying nose gear length when not loaded may be provided by a motor, such as, without limitation, electric motor, hydraulic motor, hydraulic cylinder, ram air turbine, and the like thereof.

With continued to reference to FIGS. 11A and B, in a non-limiting example, mechanical drive variable length nose gear may include a series of operation at takeoff phase, such as, without limitation, takeoff roll started, rotation speed reached, engage drive clutch, drive means operates gear extension mechanism, gear extends, gear reaches desired extension length, drive clutch disengaged, aircraft takes off, landing gear extension may be reduced by low power means to fit in more compact nose gear well and by means of one or more mechanisms listed above, and landing gear retracts. In another non-limiting example, mechanical drive variable length nose gear may include a series of operation at landing phase, such as, without limitation, aircraft flies landing approach, nose gear is extended from nose gear well, nose gear strut length is increased to desired length with low power means one or more mechanisms described above in this disclosure, aircraft touches down on nose and main gears (approximately at the same time), drive means transmission is reversed, engage drive clutch, drive means operates gear extension mechanism to lower airplane nose to desired attitude, drive clutch disengaged—nose gear length is fixed, and landing rollout is completed.

With continued reference to FIGS. 11A and B, in some embodiments, without limitation, variable length nose gear may include an electrical drive variable length nose gear, wherein the electrical drive variable length nose gear may include an electrical drive to raise nose 1124 similar to mechanical drive that derives energy extracted from motion of aircraft 1100 through one or more nose gear wheels 1128 in which cogs and chain described in mechanical drive are replaced with motor-generators and wire. In a non-limiting example, electrical drive variable length nose gear may include a plurality of components such as, without limitation, a motor-generator within or adjacent to one or more nose gear wheels 1128, a plurality of wires connects the motor-generator to a drive motor that is connected to a gearbox that drives a gear extension mechanism. In some embodiments, plurality of components of electrical drive variable length nose gear may further include a controller for motor/generator/drive motor, an overall controller of the controllers above, connection to the flight control computer and thereby to the pilot, a battery, and the like thereof. Additionally, or alternatively, electrical drive variable length nose gear may include an alternative electrical drive, wherein the alternative electrical drive may use only the drive motor and a battery to provide nose gear strut length variations. Nosewheel motor-generator may be omitted. Power may be provided to drive motor only by the battery.

With continued reference to FIGS. 11A and B, in some embodiments, without limitation, electrical drive variable length nose gear may include a series of operation at takeoff phase, such as, without limitation, takeoff roll started, rotation speed reached, wheel motor-generator controller causes electricity to be generated, a now-powered electric drive motor operates the gear extension mechanism, gear extends, gear reaches desired extension length, drive motor is turned off, airplane takes off, electric drive motor is now powered by the battery in the reverse direction to reduce the nose gear strut length before retraction (to fit in more compact nose gear well), and landing gear retracts. In another non-limiting example, electrical drive variable length nose gear may include a series of operation at landing phase, such as, without limitation, aircraft flies landing approach, nose gear is extended from nose gear well, nose landing gear strut length is increased to desired length by drive motor powered by the battery, airplane touches down on nose and main gears (approximately at the same time), drive motor, powered by battery, is operated to reduce nose gear strut length and lower the airplane nose, drive motor is stopped when desired strut length is reached, and landing rollout is completed. Further, an additional operational capability may be provided by electrical drive variable length nose gear, wherein the additional operational capability may be to power aircraft 1100 at low speed on the ground by powering the nosewheel motor-generator with the battery via the controller. Additional operational capability may enable aircraft 1100 to "push back" from the gate so that it can self-power (using engines) to the runway and onward. (It is rare that aircraft can reverse (push back) using engine reverse thrust.) Additionally, or alternatively, aircraft 1100 may be able to taxi at moderate speed using nosewheel motor-generator and battery.

With continued reference to FIGS. 11A and B, in some embodiments, without limitation, variable length nose gear may include a hydraulic drive variable length nose gear in addition to electrical drive and/or alternative electrical drive described above, wherein the hydraulic drive variable length nose gear may include a hydraulic drive to raise nose 1124 with a hydraulic struct and a hydraulic accumulator in replacement of motor and battery described above In some embodiments, hydraulic strut may provide the extension force, and accumulator may provide the energy. In some embodiments, hydraulic drive variable length nose gear may include a plurality of components, such as, without limitation, hydraulic accumulator, hydraulic drive strut, hydraulic lines between the drive strut, accumulator and low pressure return tank, hydraulic control valves between the drive strut, accumulator and low pressure return tank, a gear extension mechanism driven by the drive strut, a controller for the hydraulic strut control valves, overall controller of the controller above, a hydraulic return tank, a hydraulic line and pump between the return tank and accumulator, and the like thereof. In some cases, pump may be powered by, such as, without limitation, airplane engine generator, auxiliary power unit (APU), fuel cell, or the like. In some cases, overall controller may include a connection to the flight control computer and thereby to the pilot.

With continued reference to FIGS. 11A and B, in some embodiments, without limitation, hydraulic drive variable length nose gear may include a series of operation at takeoff phase, such as, without limitation, takeoff roll started, rotation speed reached, control valve is opened to connect the accumulator and hydraulic strut (to extends strut), landing gear extends due to the extension of the hydraulic strut, landing gear reaches desired extension length, extension control valve is closed, aircraft takes off, a control valve between the accumulator and reverse end of the hydraulic strut is opened (This retracts the hydraulic strut to fit in more compact nose gear well, and hydraulic fluid on the extend side of the strut is directed to the return tank by a control valve), landing gear is retracted, and as the airplane flies, fluid from the return tank is slowly pumped back into the accumulator. In another non-limiting example, hydraulic drive variable length nose gear may include a series of operation at landing phase, such as, without limitation, aircraft flies landing approach, nose gear is extended from nose gear well, nose landing gear strut length is increased to desired length hydraulic fluid from the accumulator, aircraft touches down on nose and main gears (approximately at the same time), valve between the extend end of the cylinder and the return tank is opened to a degree, nose is lowered at a favorable angular rate determined by the opening of the control valve, landing rollout is completed, and as the airplane taxis, fluid from the return tank is slowly pumped back into the accumulator.

With continued reference to FIGS. 11A and B, aircraft 1100 with decoupled landing gear system may need to provide very high power during the takeoff phase due to combined high force needed for rotation and high angular rate needed. In some embodiments, force needed varies according to aircraft weight, and to a lesser degree, airplane CG location. In a non-limiting example, each of variable length nose gear described above may further include a spring assist to the nose gear 1112 approximately equal to nose gear load in the lightest, most aft CG, configuration. Spring assist may provide a complimentary spring force, wherein the complimentary spring force may reduce the force needed from the actuation system, thereby reducing the required power; thereof, it may provide favorable reductions in weight, size or cost in exchange for the additional weight, size and cost of a spring system. Additionally, or alternatively, different spring types may be feasible. In some cases. Assist spring may be pneumatic, with a hydraulic coupling means (hydraulic line and cylinder). It may be a mechanical spring such as a coil spring, leaf spring, or torsion bar, for example.

Figure 12:
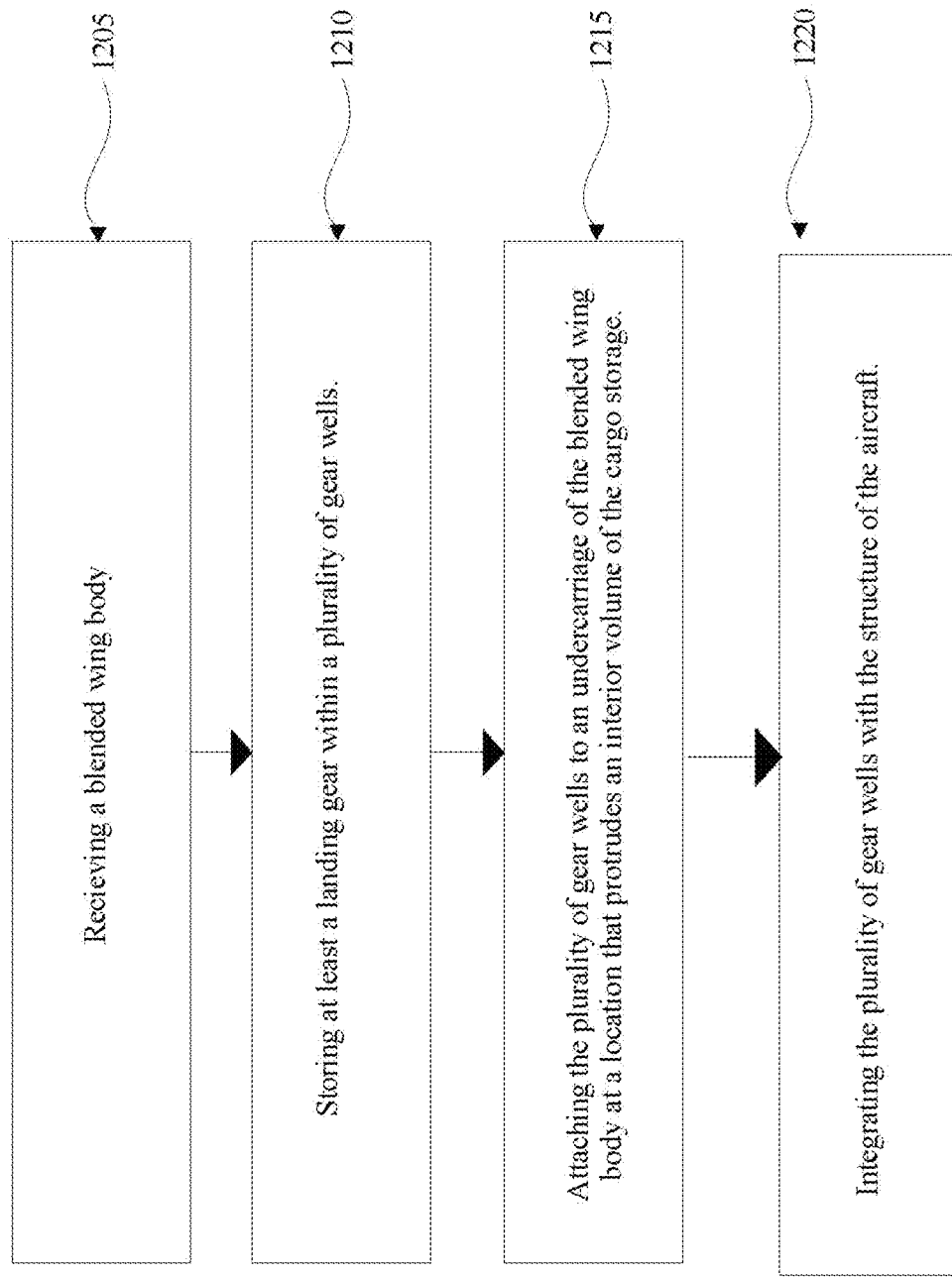
FIG. 12 is a flow diagram illustrating an exemplary method of manufacture for an exemplary aircraft with outboard-stowed landing gear.

Now referencing FIG. 12, method 1200 for manufacturing landing gear stored outboard of a cabin of an aircraft is illustrated using a flow chart. Step 1205 of method 1200 depicts receiving a blended wing body. Blended wing body may include a payload storage may be at least below the passenger cabin. Passenger cabin and payload storage may share a contiguous border. This may be implemented as described in this disclosure with reference to FIGS. 1-11.

Step 1210 of method 1200 depicts storing at least a landing gear within a plurality of gear wells. Landing gear may be stowed outboard the cabin to provide additional space in the payload volume within the cabin. Landing gear may retract upwards and inwards so that the gear may be stowed within the payload storage. Landing gear may consist at least of corresponding wheels that may be arranged in tandem in a two-wheel truck. This may be implemented as described in this disclosure with reference to FIGS. 1-11.

Step 1215 of method 1200 depicts attaching the plurality of gear wells to an lower airframe of the blended wing body. The main gear struts may be mounted to the lower airframe inboard from the payload storage by a distance approximately equal to the length of the main gear. This may be implemented as described in this disclosure with references to FIGS. 1-11.

Step 1220 of method 120 depicts integrating the plurality of gear wells with the structure of the aircraft. The gear wells may be integrated with the structure of the aircraft using any of the methods described in this disclosure with references to FIGS. 1-11.

Figure 13:
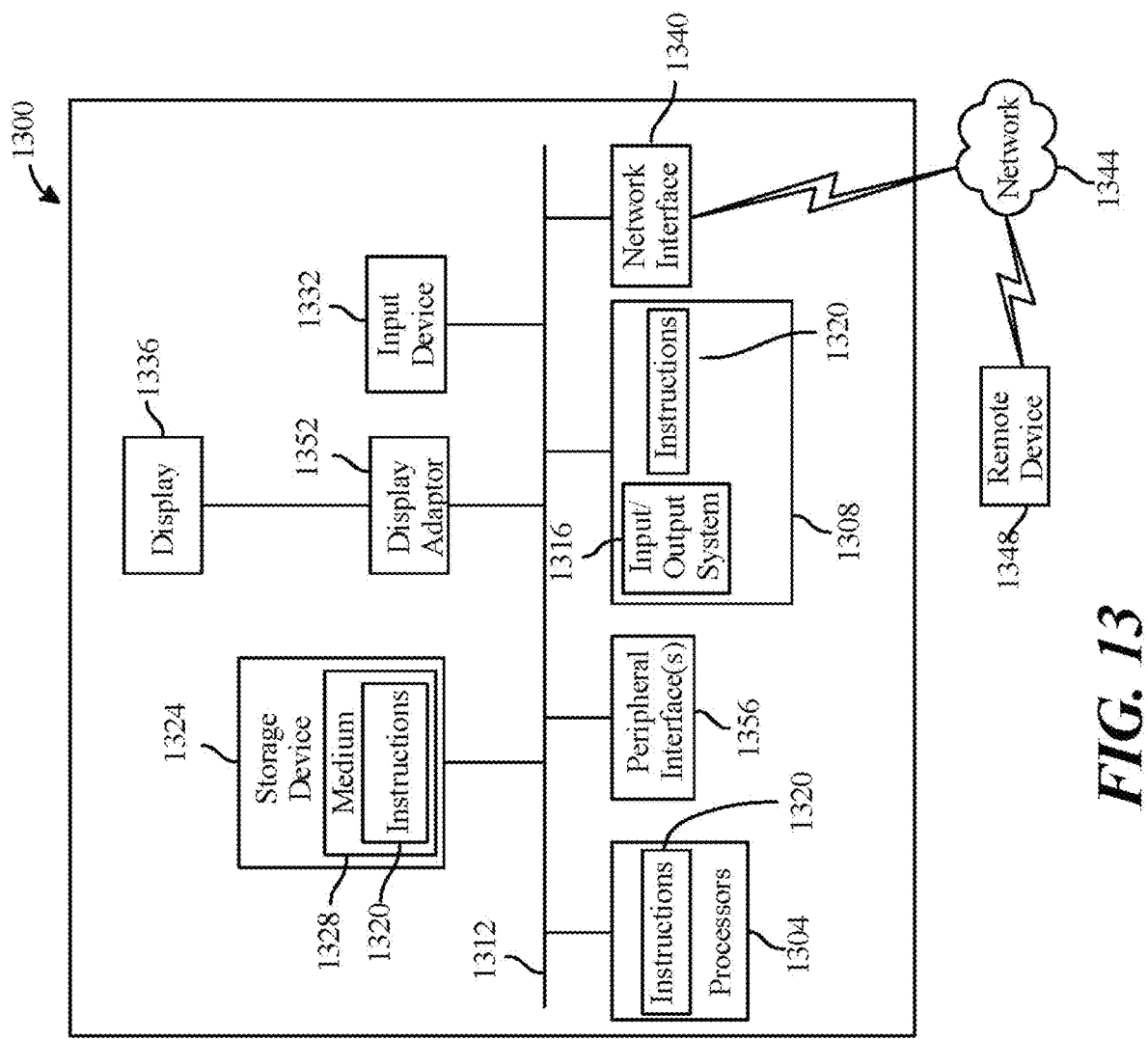
FIG. 13 is a block diagram of a computing system that can be used to implement any one or more of the methodologies disclosed herein and any one or more portions thereof.

Referring now to FIG. 13, an exemplary embodiment of a computing device in the exemplary form of a computer system 1300 within which is a set of instructions for causing a control system to perform any one or more of the aspects and/or methodologies of the present disclosure may be executed. System may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting [computing device] to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 1300 and/or computing device.

With continued reference to FIG. 13, computing device may be designed and/or configured to perform any method, method step, or sequence of method steps in any embodiment described in this disclosure, in any order and with any degree of repetition. For instance, [computing device] may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1294 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body (BWB) aircraft with stowed landing gears outboard of a cabin, the BWB aircraft comprising:
   an exterior surface of a lower airframe of the BWB aircraft;

an interior surface opposite the exterior surface of the lower airframe surrounding a payload volume and a cargo volume, wherein the payload volume comprises the cabin;

a plurality of gear wells comprising at least a main gear well and at least a nose gear well, wherein:
- each gear well of the plurality of gear wells includes an opening in the exterior surface of the lower airframe of the BWB aircraft;
- the at least a main gear well has a main gear well volume that is located outboard of the payload volume, wherein the at least a main gear well protrudes into an interior of the cargo volume, and wherein the at least a main gear well is disposed in a blended section of the BWB aircraft, aft of a center of gravity (CG) of the BWB aircraft and wherein the blended section comprises no strong delineation between a body and a wing of the BWB aircraft;
- the at least a nose gear well has a nose gear well volume that is located outboard of the payload volume; and
- each gear well is disposed about the center of gravity of the BWB aircraft;

a plurality of main gear struts, wherein at least one main gear strut of the plurality of main gear struts is mounted to the lower airframe outboard from the payload volume by a distance equal to a length of a main landing gear of at least a main landing gear of the BWB aircraft; and a plurality of landing gears disposed at the plurality of gear wells and comprising the at least a main landing gear and at least a nose landing gear, wherein the at least a nose landing gear includes a nose linkage and the at least a main landing gear includes a main linkage and wherein the nose linkage and the main linkage are connected by a longitudinal member which is driven by both the main linkage and the nose linkage such that movement of the at least a nose landing gear and the at least a main landing gear is affected, and wherein:
- at least one of the at least a main landing gear and the at least a nose landing gear comprises a jump strut and pneumatic spring assist;
- each landing gear of the plurality of landing gears has a proximal end located within the gear well volume and a distal end;
- each landing gear has at least a wheel journaled at the distal end;
- each landing gear is movable between a deployed position and a retracted position; and
- the at least a nose landing gear is configured to extend corresponding to retraction of the at least a main landing gear by tuning a suspension.

2. The BWB aircraft of claim 1, wherein the at least a nose landing gear is disposed forward of the center of gravity and the at least a main landing gear is located aft of the center of gravity.

3. The BWB aircraft of claim 1, wherein the plurality of landing gears is in tricycle formation.

4. The BWB aircraft of claim 1, wherein the at least a main landing gear is stowed within the at least a main gear well.

5. The BWB aircraft of claim 1, wherein the at least a nose landing gear and the at least a main landing gear are further configured to be retracted and deployed in tandem.

6. The BWB aircraft of claim 1, wherein a plurality of nose wheels are arranged in tandem.

7. The BWB aircraft of claim 1, wherein the body comprises carbon fiber.

8. The BWB aircraft of claim 1, wherein the at least a main landing gear is coupled to a lateral shaft.

9. The BWB aircraft of claim 1, wherein the at least a main landing gear is connected to the main linkage.

10. The BWB aircraft of claim 1, wherein the at least a nose landing gear is connected to the nose linkage.

11. The BWB aircraft of claim 8, wherein the lateral shaft is a torque tube.

12. The BWB aircraft of claim 1, wherein the plurality of landing gears comprises at least a brake.

13. The BWB aircraft of claim 1, wherein the jump strut comprises an electrical drive.

14. The BWB aircraft of claim 1, wherein the jump strut comprises a spring assist feature.

15. The BWB aircraft of claim 1, wherein the at least a nose landing gear is further configured to retract corresponding to extension of the at least a main landing gear by tuning the suspension.

* * * * *